United States Patent
Le Nerriec et al.

(10) Patent No.: US 9,178,962 B2
(45) Date of Patent: Nov. 3, 2015

(54) SYSTEM AND METHOD FOR AUTHENTICATING MULTIPLE DEVICES WITH A SAME CREDENTIAL

(71) Applicant: QUALCOMM Incorporated, San Diego, CA (US)

(72) Inventors: Yohan Le Nerriec, San Francisco, CA (US); Jehan Gerard Bing, Menlo Park, CA (US); Alexandre Guion, San Francisco, CA (US); Judah John Menter, Oakland, CA (US); Daniel D. Tai, Union City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 14/091,049

(22) Filed: Nov. 26, 2013

(65) Prior Publication Data
US 2014/0150079 A1    May 29, 2014

Related U.S. Application Data

(60) Provisional application No. 61/730,797, filed on Nov. 28, 2012, provisional application No. 61/800,274, filed on Mar. 15, 2013.

(51) Int. Cl.
*G06F 15/16* (2006.01)
*H04L 29/08* (2006.01)
(Continued)

(52) U.S. Cl.
CPC .............. *H04L 67/32* (2013.01); *G06F 3/0484* (2013.01); *H04L 63/0815* (2013.01); *H04L 63/10* (2013.01); *H04L 2463/101* (2013.01)

(58) Field of Classification Search
CPC ... G06F 3/0484; H04L 63/0815; H04L 67/32; H04L 2463/101; H04L 63/10

USPC ............................................................ 726/8
See application file for complete search history.

(56) References Cited

U.S. PATENT DOCUMENTS 7,392,393 B2    6/2008    Taki
7,574,723 B2    8/2009    Putterman et al.
(Continued)

FOREIGN PATENT DOCUMENTS

WO    WO-2011084117 A1    7/2011

OTHER PUBLICATIONS

Barisch, M., "Design and Evaluation of an Architecture for Ubiquitous User Authentication Based on Identity Management Systems", Trust, Security and Privacy in Computing and Communications (TRUSTCOM), 2011 IEEE 10th International Conference on, IEEE, Nov. 16, 2011, pp. 863-872, XP032086891, DOI: 10.1109/TRUSTCOM.2011.116 ISBN: 978-1-4577-2135-9, Abstract section II, section V, figure 4.
(Continued)

*Primary Examiner* — Baotran N To
(74) *Attorney, Agent, or Firm* — Mahamedi Paradice LLP

(57) ABSTRACT

A first device implements an application platform that is shared with a second device. The application platform can be implemented so that the first device and the second device operate to have a same identity to at least the network service. The first device provides a user interface in order to receive input for accessing or using the network service. Additionally, the first device communicates input received in response to providing the user interface to the network service. The first device can receive a token from the network service in response to communicating the input. Additionally, the first device can communicate a set of data items to the second device. The set of data items includes the token and one or more identifiers that enable the second device to access and use the network service while appearing as the first device to the network service.

20 Claims, 8 Drawing Sheets

(51) Int. Cl.
*G06F 3/0484* (2013.01)
*H04L 29/06* (2006.01)

(56) References Cited

U.S. PATENT DOCUMENTS

| | | | |
|---|---|---|---|
| 7,769,177 | B2 | 8/2010 | Son et al. |
| 7,908,635 | B2 | 3/2011 | Barton et al. |
| 7,925,592 | B1 | 4/2011 | Issa et al. |
| 7,975,312 | B2 | 7/2011 | Brodersen et al. |
| 8,152,642 | B2 | 4/2012 | Ergen et al. |
| 2006/0173974 | A1 | 8/2006 | Tang |
| 2007/0086394 | A1 | 4/2007 | Yamada et al. |
| 2008/0168568 | A1* | 7/2008 | Brodersen et al. ............ 726/30 |
| 2009/0157799 | A1 | 6/2009 | Sukumaran et al. |
| 2011/0167444 | A1 | 7/2011 | Sun et al. |
| 2012/0117586 | A1 | 5/2012 | McCoy et al. |
| 2012/0210276 | A1 | 8/2012 | Wong et al. |
| 2012/0210346 | A1 | 8/2012 | McCoy et al. |
| 2013/0198770 | A1 | 8/2013 | Xiong et al. |
| 2014/0149544 | A1 | 5/2014 | Le Nerriec et al. |
| 2014/0149876 | A1 | 5/2014 | Le Nerriec et al. |

OTHER PUBLICATIONS

International Search Report and Written Opinion—PCT/US2013/072405-ISA/EPO—Mar. 31, 2014.
Liu, Y., et al., "Rights Sharing Scheme for Online DRM System Using Digital Ticket", Management and Service Science, 2009. MASS'09. International Conference on, IEEE, Piscataway, NJ, USA, Sep. 20, 2009, pp. 1-6, XP031556542, ISBN: 978-1-4244-4638-4 abstract Sections I, II and III Figure 1.
Vrancken, B., et al., "Using OAuth for Recursive Delegation; draft-vrancken-oauth-redelegation-01.txt", Using Oauth for Recursive Delegation; Draft-Vrancken Oauth-Redelegation-01.txt, Internet Engineering Task Force, IETF; Standard Working Draft, Internet Society(ISOC) 4, Rue des Falaises CH-1205 Geneva, Switzerland, No. 1, Mar. 8, 2010, pp. 1-11, XP015067980, [retrieved on Mar. 8, 2010], section 3.3.

* cited by examiner

SYSTEM AND METHOD FOR AUTHENTICATING MULTIPLE DEVICES WITH A SAME CREDENTIAL

RELATED APPLICATIONS

This application claims benefit of priority to (i) Provisional U.S. Patent Application No. 61/730,797, filed Nov. 28, 2012, entitled SYSTEM AND METHOD FOR USE OF NETWORK SERVICES IN RECEIVING CONTENT AND DATA; and (ii) Provisional U.S. Patent Application No. 61/800,274, filed Mar. 15, 2013, entitled SYSTEM AND METHOD FOR USE OF NETWORK SERVICES IN RECEIVING CONTENT AND DATA; both of the aforementioned priority applications being hereby incorporated by reference in their respective entirety.

TECHNICAL FIELD

Embodiments described herein pertain generally to a system and method for presenting content, and more specifically, a system and method for presenting content with time-based metadata.

BACKGROUND

Network services (or sometimes referred to as "cloud" computing services) exist in various forms. For example, cloud music services include PANDORA, SPOTIFY and RHAPSODY are available to users on various computing platforms. More generally, a variety of network services are available to users, such as streaming services for movies, photo-sharing sites, social networking sites, and gaming sites. Numerous types of devices are used to access these services. For example, it is common for network services to be accessible to mobile devices, tablets and personal computers operating different types of applications or browsers.

DETAILED DESCRIPTION

Figure 1:
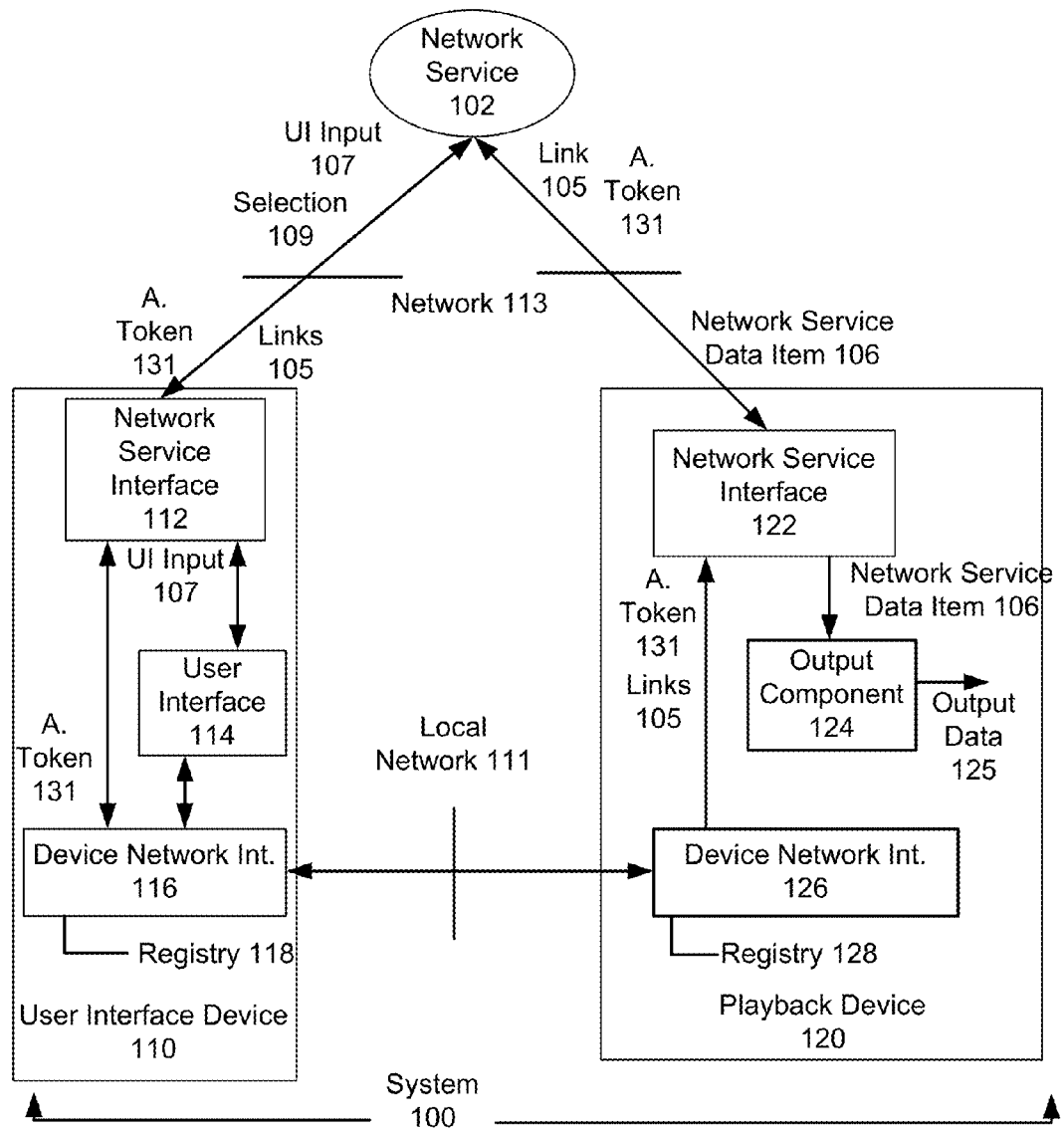
FIG. 1 illustrates an example system in which multiple devices cooperate with one another in accessing a network service for network service data items.

Embodiments described herein provide for a computing environment in which the use of a network service can be distributed amongst multiple devices. In particular, examples described herein provide for a retrieval or playback device that communicates with a network service to receive data items (e.g., content). In the same session, another device can communicate with the network service to handle user interface events and functionality on behalf of the retrieval or playback device. Such a configuration enables more diversity in the type of device that can be used for retrieval or playback of data items from a network service. For example, an appliance or dedicated player can operate to retrieve content from a network service, without need for the device to enable direct user interaction. Rather, the user interaction that may otherwise be required from the appliance or dedicated player can be provided through another device.

Additionally, some embodiments provide for use of an intermediary rights management service which can operate to communicate rights management rules that control the manner in which retrieval or playback devices access and use a given network service. The rights management service can be used to enable an independent or non-platform specific application to be used in connection with retrieval or playback operations from any one of multiple network services. Among other benefits, the rights management service enables network services to be accessed and used without the need for proprietary or specific client applications which implement rights management rules for specific network services.

In some embodiments, a network service is utilized by multiple devices. In an embodiment, a first device implements an application platform that is shared with a second device. The application platform can be implemented so that the first device and the second device operate to have a same identity to at least the network service. The first device provides a user interface in order to receive input for accessing or using the network service. Additionally, the first device communicates input received in response to providing the user interface to the network service. The first device can receive a token from the network service in response to communicating the input. Additionally, the first device can communicate a set of data items to the second device. The set of data items includes the token and one or more identifiers that enable the second device to access and use the network service while appearing as the first device to the network service.

In another variation, a playback device implements an application platform that is shared with a user interface device. The application platform can be implemented so that the playback device and the user interface device can operate to have a same identity to at least the network service. The playback device communicates with the user interface device to receive a set of data items, the set of data items including (i) a token communicated by the network service to the user interface device, and (ii) one or more identifiers that are used by the user interface device in order to access the network service. The playback device accesses the network service using the token and the one or more identifiers received from the user interface device.

According to some embodiments, a universal retrieval or playback component can be used with an intermediary rights management service in order to enable a computing device to access and utilize any one of multiple possible network services, in accordance with rights management rules of that service.

Among other benefits, embodiments described herein enable for various kinds of network services (e.g., cloud media services, photo-sharing sites, etc.) to be received and utilized on a diverse range of devices (e.g., Internet-enabled accessories or appliance devices that stream content). In particular, devices can utilize such services without requirement for the device to enable user interaction. Additionally, some embodiments provide for devices to use a universal program or resource to access network services, so that such devices do not need to have resident (or previously installed) a proprietary or service-specific application to implement functionality such as rights management rules.

Some embodiments described herein provide a system, method and device for utilizing a network service. In one embodiment, a first device is operable to provide a user interface for the network service. From the first device, input received in response to providing the user interface is communicated to the network service. In response to communicating the input, the user interface device receives a token for accessing the network service. The user interface device communicates the token to a playback device.

According to another embodiment, a playback device operates to receive plurality of links from a user interface device. The plurality of links can identify (or be used to identify) one or more network service data items. A network service data item that is identified by each of the plurality of links is retrieved from the network service. While the network service data items are retrieved, the playback device detects an occurrence of a user interface event that is generated from the network service. Data identifying the user interface event is communicated to the user interface device.

Still further, an embodiment includes a system comprising a first device and a second device. The first device provides a user interface, and the second device includes a data output component. The first device may be configured to receive information from a user through the user interface, and to communicate the information to the network service. The first device may also receive a token or other programmatic credential from the network service in response to communicating the information. The first device may communicate the token to the second device. The second device may be configured to use the token to access the network service without receiving input from the user. The data items received from the network service are outputted using the output component.

Still further, an embodiment provides for a playback device that operates to receive a plurality of links from a user interface device. Each of the plurality of links identifies one or more network service data items. A network service data item is retrieved as identified by each of the plurality of links. While retrieving the network service data item identified by each of the plurality of links, an occurrence of a user interface event is detected with the network service. Data identifying the user interface event is communicated to the user interface device.

In another embodiment, network service is utilized on a playback device. On a first device, a session is established with a network service to receive media data items for playback. With the first device, a second device is controlled to use the programmatic credential of the first device to access the network service and retrieve media data items during the session.

In another embodiment, a computer system is provided for utilizing a network service. The computer system includes a memory to store a plurality of network service libraries, where each network service library is associated with a corresponding network service. Each network service library may include (i) a collection of link data, the link data identifying a data item provided on the network service, and (ii) a set of rights management rules for the network service. A processor of the computer system can determine the network service that is specified by the communication. The processor can also determine, from the network service library, the link data in the collection of link data that identifies each identifier in the set of identifiers. One or more control parameters are also determined for the communication that are based on the set of rights management rules for the determined service. A set of links are communicated to the playback device that are based on the determined link data. The set of links may also be communicated with the control parameters to enable the playback device to retrieve data items from the determined network service in accordance with the set of rights management rules for that network service.

In an embodiment, a first set of links is received from a user interface device. Each link in the first set of links (i) identifies a data item on a corresponding first network service, and (ii) directs the playback device to an intermediary network service. The first set of links is signaled to the intermediary network service, and in response, a second set of links are received from the intermediary network service. Each link in the second set of links identifies the data item of one of the first of identifiers.

According to another embodiment, a first set of links are structured, so that each link in the first set of links (i) identifies a data item on a corresponding first network service, and (ii) links to an intermediary network service. The first set of links is signaled to a playback device to cause the playback device to access the intermediary network service.

Still further, an embodiment provides a player on a computing device that is able to playback content from multiple network services. A network service can detect and use the player as an alternative to a service-specific application for that service. Media resources from the network service can be played back by accessing an intermediate rights management service to identify a set of media resources from the network service for playback. A set of playback links for each media resource in the set are received from the intermediate rights management service. The set of playback links each link to a corresponding media resource provided from the network service.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many multifunctional phones and portable computing devices), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Overview

FIG. 1 illustrates an example system in which multiple devices cooperate with one another in accessing a network service. In particular, an example system 100 enables network services 102 to be accessed and used through a first device, which is provided in FIG. 1 as a user interface device 110, and a second device, which is provided in FIG. 1 as a playback device 120. The network service 102 can be accessed over a network 113 (e.g., Internet) by each of the user interface device 110 and playback device 120 through, for example, a website. The network services 102 that can be used by an example system 100 include, for example, websites (e.g., social networking sites, photo sharing sites etc.), or cloud-based media services (e.g., music playback sites such as PANDORA).

Among other benefits, the example of FIG. 1 recognizes that while there are numerous kinds of network enabled devices, some network enabled devices are not suited for handling user interface interactions required from network services 102. For example, some devices such as televisions require users to utilize remote controls that are difficult to operate in providing input. Other devices, such as (streaming or re-streaming appliances) and have limited or no user interactive capabilities that are local on the device. Such operating environments limit the ability of these devices to utilize network services, particularly when such services require user interaction for certain events.

With reference to an example of FIG. 1, system 100 includes a user interface device 110, and playback device 120. The user interface device 110 can correspond to any network enabled computing device that is capable of receiving user input, and of communicating such input to other devices and/or network services or websites. As examples, the user interface device 110 can correspond to a mobile computing device (e.g., multifunctional cellular/telephony device, such as smart phone), tablet, laptop, netbook, combination computing device, personal computer, etc. The user interface device 110 can include a network service interface 112, a user interface 114, and a device network interface 116. The components can be implemented using a combination of hardware, logic and/or software. The network service interface 112 can comprise software or logic for accessing network locations or sites that are associated with or otherwise used in providing resources for the network service 102. The network service interface 112 includes logic (e.g., client application, such as commercially available browser or web-based application) for utilizing a network port (e.g., a wireless port, such as a cellular, Wireless Fidelity ("WiFi"), or Bluetooth) on the user interface device 110. The user interface 114 can include a combination of input and/or output components, such as a touchscreen display, microphone (with corresponding speech recognition), keyboard or other button input mechanism, or other kinds of user interface mechanisms. The device network interface 116 can include logic (e.g., application) that utilizes a same or different network port to communicate with at least the playback device 120. In some implementations, the device network interface 116 can include logic (e.g., software, firmware) for enabling the device to be a member of a personal network.

In an example of FIG. 1, the playback device 120 can include a network service interface 122, output component 124 and device network interface 126. As an example, the playback device 120 can correspond to an appliance for accessing cloud services, network resources etc. For example, the playback device 120 can correspond to a streaming output appliance, a television, or an Internet appliance. In some variations, the playback device 120 can be another computing device that has user interface capabilities, but by user preference or designation, is used in conjunction with the user interface device 110 to access the network service 102. Thus, the playback device 120 can correspond to mobile computing device (e.g., multifunctional cellular/telephony device, such as smart phone), tablet, laptop, netbook, combination computing device, personal computer, etc. The network service interface 122 includes logic for utilizing a network port (e.g., a wireless port, such as a cellular, Wireless Fidelity ("WiFi"), or Bluetooth) on the playback device 120.

The output component 124 generates playback data 125, which can be outputted as audio and/or video. In one implementation, the playback device 120 includes output devices, such as speakers and/or a display screen, for providing the output from the playback data 125. In another implementation, the playback device 120 communicates the playback data 125 in some form to another connected device. For example, playback device 120 can signal a connected device analog and/or digital data corresponding to the playback data 125. In variations, playback device 120 can further process the playback data 125, by for example, transcoding the playback data 125 into another format. Still further, the playback device 120 can utilize other services or components (e.g., network connected components) to output content based on the playback data 125, and/or to process the playback data 125 (e.g., transcode the playback data 125 on another device).

The device network interface 126 of the playback device 120 can include logic (e.g., application) that utilizes a same or different network port to communicate with at least the user interface device 110. In some implementations, the device network interface 116 can include logic (e.g., software, firmware) for enabling the device to communicate with the user interface device 110.

The user interface device 110 and playback device 120 can communicate with one another over a network link 111. The network link 111 can correspond to, for example, a local network link, and more specifically, to a wireless local link (e.g., WiFi or Bluetooth link). In variations, the network link 111 can utilize a wide area network, such as a cellular network and/or the Internet.

In some implementations, each of the user interface device 110 and the playback device 120 can operate as a satellite on a personal network, such as described in U.S. patent application Ser. No. 10/808,606 (this application being hereby incorporated by reference in its entirety for all purposes). In such an implementation, each of the user interface device 110 and the playback device 120 can utilize an application or other programming logic that enables that device to communicate its capabilities and connection status to a registry of devices of a specific personal network. The registry can be centralized on one device (e.g., personal computer), distributed on multiple devices of the personal network, or provided as a network service. In one implementation, each of the user interface device 110 and the playback device 120 include a personal network registry 118, 128, respectively, which enables that device to act as a member (or satellite) of a user's personal network. When implemented as a personal network, some of the communications and functionality described as between the user interface device 110 and the playback device 120 can be automatically initiated or performed, in response to certain conditions. For example, the user's operation of the user interface device 110 can trigger the playback device 120 to communicate with and utilize the network service 102, in a manner described below with various embodiments. Similarly, another implementation may provide for use of the playback device 120 to automatically initiate operation such as described below on the user interface device 110.

In some embodiments, user interface device 110 is operated to gain access to the network service 102. For example, the user can launch a shortcut or application launch on user interface device 110. In response, an application operating on user interface device 110 generates user interface features for prompting the user to provide input that may be required or otherwise utilized with network service 102. The input provided by the user can be used to access the network service 102. In one limitation, user interface device 110 communicates user input 107 to the network service 102 via the network service interface 112. The user input 107 can correspond to, for example, login and password information, or other account/identification information for enabling the network service 102 to determine an account or setting for the user. In response, the network service 102 can issue an authorization token 131 to the user interface device 110. The authorization token 131 can correspond to a data item that is issued by a secure network site to identify and/or authenticate the user. The network service interface 112 may communicate the authorization token to the device network interface 116, which in turn communicates the authorization token 131 to the playback device 120. In one implementation, the user interface 116 of the user interface device 110 and the output component 124 of the playback device 120 are part of a common application or application platform, so as to enable the authorization token 131 to be communicated from user interface device 110 to the playback device 120, and then used on the playback device 120.

In addition to obtaining and signaling the authorization token 131, the user interface device 110 can be used to specify selection input 109, for selection of specific network service data items 106 for selection or retrieval by the playback device 120. For example, the user interface device 110 can be used to search, navigate, browse or otherwise identify data items for selection or retrieval from the network service 102. In response to receiving the selection input 109, the network service 102 can provide links 105 for enabling retrieval of the selected network service data items. In variations, the network service 102 can be triggered to automatically identify network service data items for the user or device. Still further, in other variations, the selection input 109 can be sent from the playback device 120. For example, the playback device 120 can store selection input 109 (e.g., favorite playlist, etc.), or receive the selection input 109 from the user interface device 110.

The playback device 120 receives the authorization token 131 from the user interface device 110. In one implementation, the device network interface 126 of the playback device 120 receives the authorization token 131 from the user interface device 110, and then communicates the token to the network service 102 via the network service interface 122. In addition to signaling the authorization token 131, the playback device 120 may signal links 105 for selected data items. For example, the playback device 120 can signal links 105 to the network service that identify media files (e.g., music, video). The links 105 identify network service data items 106, which network service 102 communicates to the playback device 120. The output component 124 generates playback data 125 corresponding to the network service data items 106.

In some implementations, the playback device 120 is triggered to automatically access the network service 102 using the authorization token 131 and links 105 by the user interface device 110. For example, the user interface device 110 can trigger the playback device 120 into accessing data items from the network service 102 by signaling the authorization token 131.

Playback Device

Figure 2:
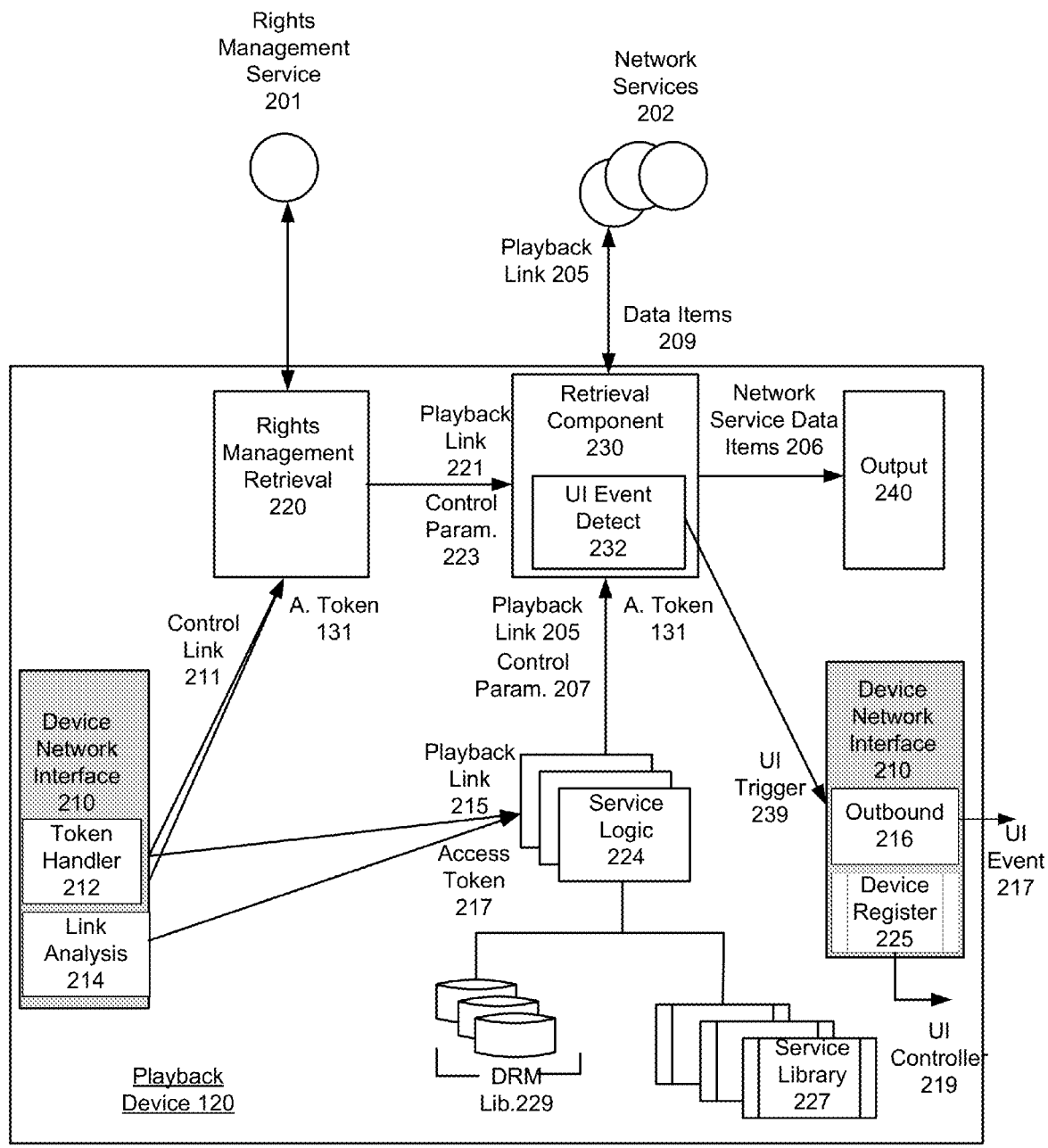
FIG. 2 illustrates a logical architecture for a playback device, according to one or more embodiments.

FIG. 2 illustrates a logical architecture for a playback device, according to one or more embodiments. In an embodiment, a playback device 120 includes a device network interface 210, a retrieval component 230 and an output component 240. In one embodiment, playback device 120 is programmatically configured to communicate and retrieve data items from various different network services. For example, the playback device 120 can be configured to use links to identify data items from a network service, and then trigger operations in which the select data items are streamed from the network service to the playback device 120. As another example, the playback device 120 can be configured to use links to download documents or files identified by the links.

The playback device 120 includes service logic 224, which can include instruction sets and/or configuration data for individual network services. In one implementation, the service logic 224 can include plugins or program files. Additionally, the service logic 224 can include resources for network services, including a network service library 227 and a digital rights management (DRM) library 229. The network service library 227 can store, for example, links 205 for use in retrieving network service data items from a corresponding network service 202. The DRM library 229 can be provided from a corresponding network service to control, for example, the playback or use of media resources from the network service 202.

The device network interface 210 includes components for communicating with other devices of the user, such as user interface device 110 (see FIG. 1). In one implementation, the device network interface 210 includes inbound components corresponding to a token handler 212 and a link analysis 214. The token handler 212 receives the token 131 (see FIG. 1) from the user interface device 110, and communicates the token to a service logic 224 for accessing an appropriate network service. The link analysis 214 can operate to detect properties of links 205 received from, for example, the user interface device 110. For example, the link analysis 214 can determine the particular network service 202 that is to be utilized in connection with the particular link. In some variations as described below, the link analysis 214 can also be used to determine whether a rights management service 201 is to be utilized in connection with retrieving a corresponding network service data item from a corresponding network service 202. Both the authorization token 131 and the playback links 205 can be communicated to the service logic 224 for enabling the retrieval component 230 to access and retrieve data items from the particular network service 102.

In some embodiments, the retrieval component 230 uses the authorization component 131 to access a set of data items 219 from a corresponding network service 202. The retrieval component 230 uses the authorization token 131 and one or more playback links 205 to retrieve the data items 219. The playback links 205 can be stored as part of the particular network service library 227, communicated from the user interface device 110, received from the network service 202, or from an intermediary service (as described below). The retrieval component 230 may sequence or otherwise communicate playback links 205 in series, based on, for example, control rules as specified in the DRM library 229, or as communicated from, for example, the user interface device 110.

The retrieval component 230 can be controlled by control parameters 207 in the manner that links 205 can used. For example, the timing or sequence of how the links 205 are retrieved can be controlled by the control parameters 207. The control parameters 207 can be identified by the service logic 224 used in retrieving the media resources from the network service 202. For example, the control parameters 207 can be identified or determined from the DRM library 229 used or associated with the particular network service.

The retrieval component 230 uses the playback links 205 to retrieve data items 209 from the network service 202. In one implementation, data corresponding to retrieved network service data items 206 are signaled to the output component 240. The output component 240 can generate output content or playback on the playback device 120. In a variation, data 206 corresponding to retrieved network service data items 206 are signaled to the device network interface 210 for processing or communication. For example, the data 206 can be signaled to (i) other devices that are connected or linked to the playback device 120, (ii) another elements of the same personal network for output, or (iii) another element of the same personal network for services (e.g., transcoding). Still further, data 206 can be stored on the playback device 120 for later use.

Embodiments recognize that many network services include events that trigger the need for user interaction, and the ability of the user to respond to the events may be required to avoid disruption in the availability of the services. For example, a network service may prompt the user for login and password information intermittingly, or ask the user a question (e.g., ask the user to rate the service). In some embodiments, the retrieval component 230 includes a user interface event detection component 232. When a particular network service encounters a user interface event, the UI event detect 232 signals a UI trigger 239 that initiates rendering of the UI event on the user interface device 110. In one implementation, the UI trigger 239 is received by an outbound component 216 of the device network interface 210, which then signals the UI event 217 to the user interface device 110.

In some embodiments, the device network interface 210 also operates to enable the playback device 120 to act as an element or satellite on a personal network of the user. The device network interface 210 may include a device register 225 that identifies other elements (programs, devices, data sources, accounts etc.) of a user's personal network. In particular, the device register 225 can include data that identifies (i) a status of other elements of the personal network (e.g., whether other element is active), (ii) relevant capabilities that can be utilized by the playback device 120 (e.g., transcoding), and (iii) a network location of the other elements of the personal network. In this way, the device network interface 210 can signal data 206 to other elements of the personal network, and/or utilize resources of the personal network in handling the data 206.

Rights Management Retrieval on Playback Device

In some embodiments, the playback device 120 is able to utilize an intermediary rights management service 201. With further reference to FIG. 2, an intermediary rights management service 201 can provide a service that enables rights management controls of different network services 202 to be implemented as a separate network service. The use of a web service, for example, to implement rights management for a network service provides an alternative to conventional approaches, in which each network service 202 requires rights management controls to be implemented as part of the client application. Among other benefits, some embodiments enable use of the intermediary rights management service 201 to eliminate or reduce the need to maintain service-specific programmatic or data resources on the playback device 120.

On the playback device 120, the device network interface 210 receives control links 211 which direct a rights management retrieval component 220 to the rights management service 201. The rights management retrieval component 220 uses the control links 216 to access the rights management service 201. The rights management service 201 identifies control parameters 223 of the network service 202 that is to be utilized by the particular set of control links 211. As described with other examples, the rights management service 201 can be used to handle rights management for multiple network services (e.g., PANDORA, SPOTIFY, etc.). In one implementation, the rights management service 201 signals playback links 205 to the playback device 120, along with control parameters 223 that are specific to the network service 202 identified in the control links 211. The playback links 205 and control parameters 223 are used by the retrieval component 230 to retrieve data items 209 from the particular network service 202.

Methodology

Figures 3A, 3B:
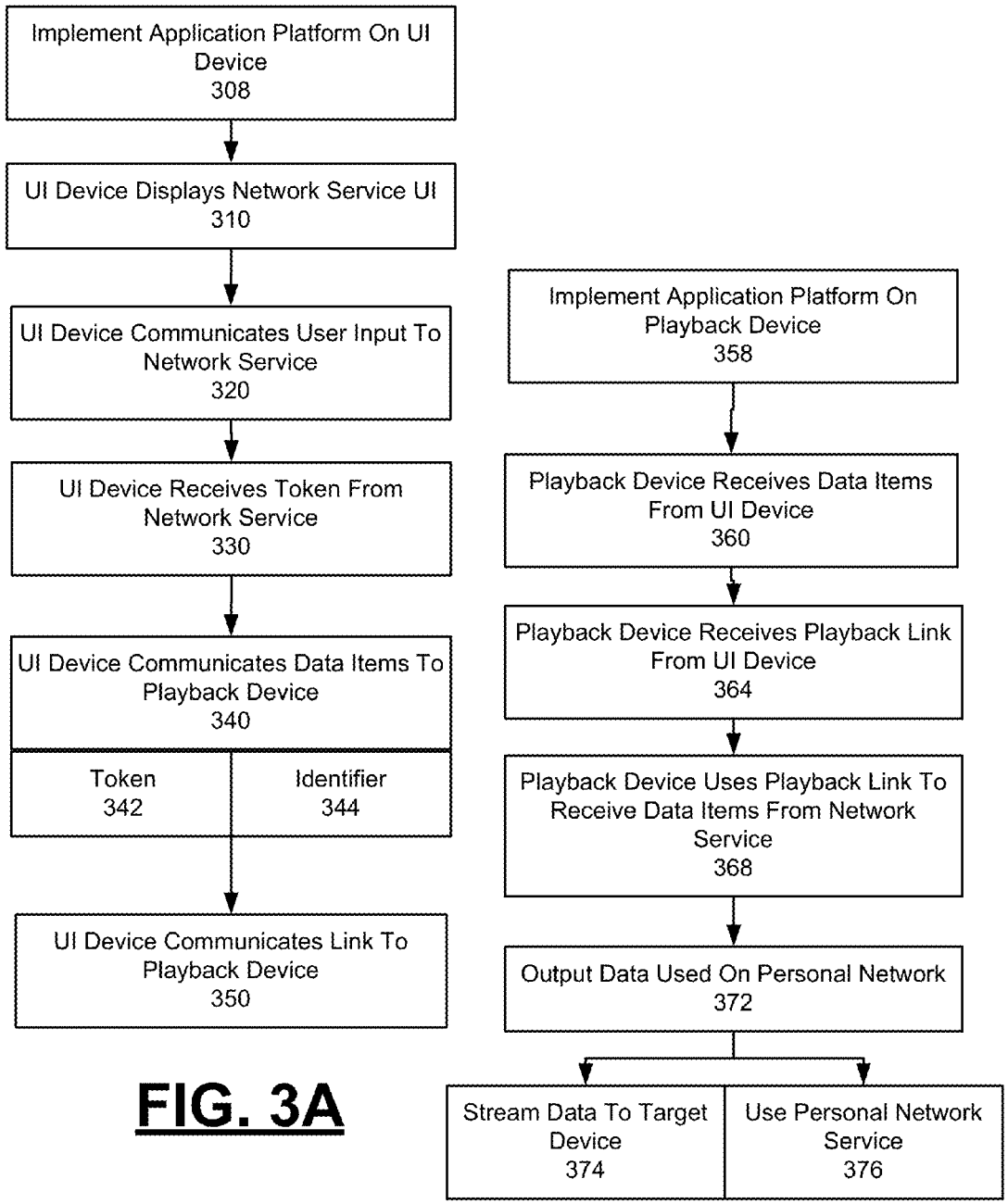
FIG. 3A illustrates a method for operating a computing device to handle user interface operations for a network service, separate from a device in which playback functionality is provided, according to one or more embodiments.
FIG. 3B illustrates a method for operating a playback device to output content from a network service, separate from a device in which user interface functionality for the network services is provided, according to one or more embodiments.
Figure 3C:
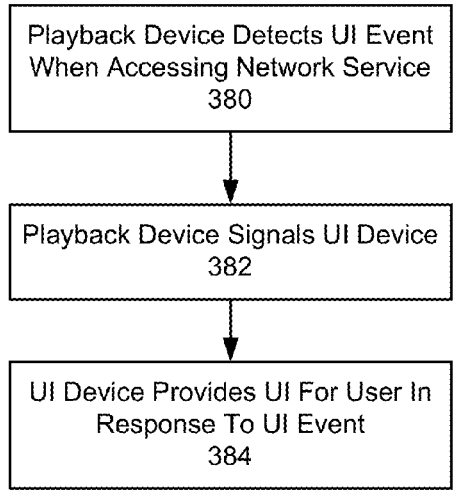
FIG. 3C illustrates a method for handling user interface events generated from a network service when multiple devices access the network service at the same time.
Figure 3D:
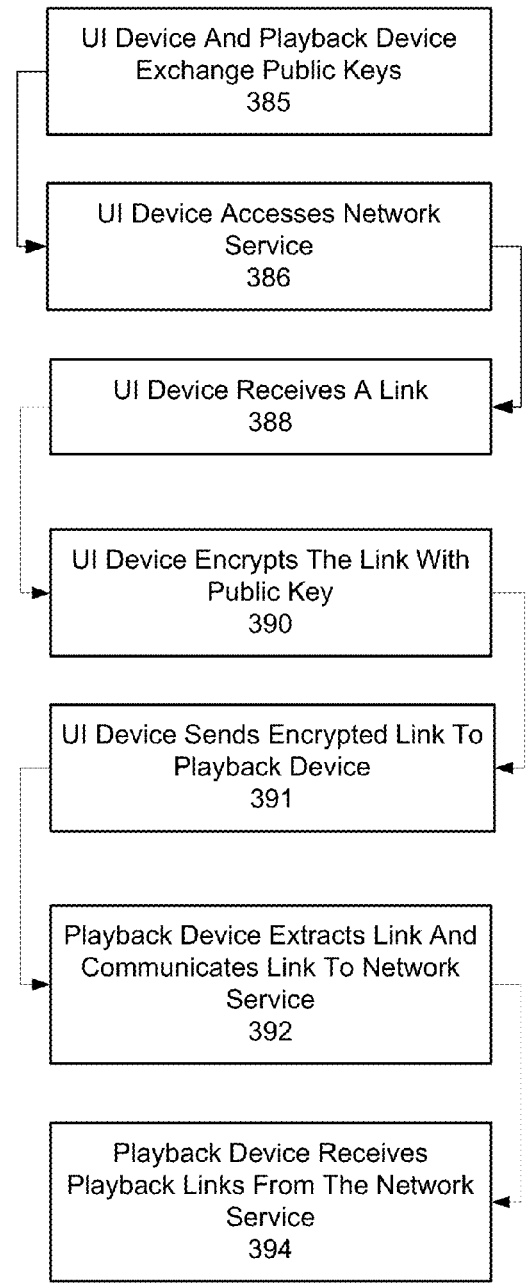
FIG. 3D illustrates an example method for implementing a digital rights management (DRM) scheme in context of two devices that access a network service.
Figure 3E:
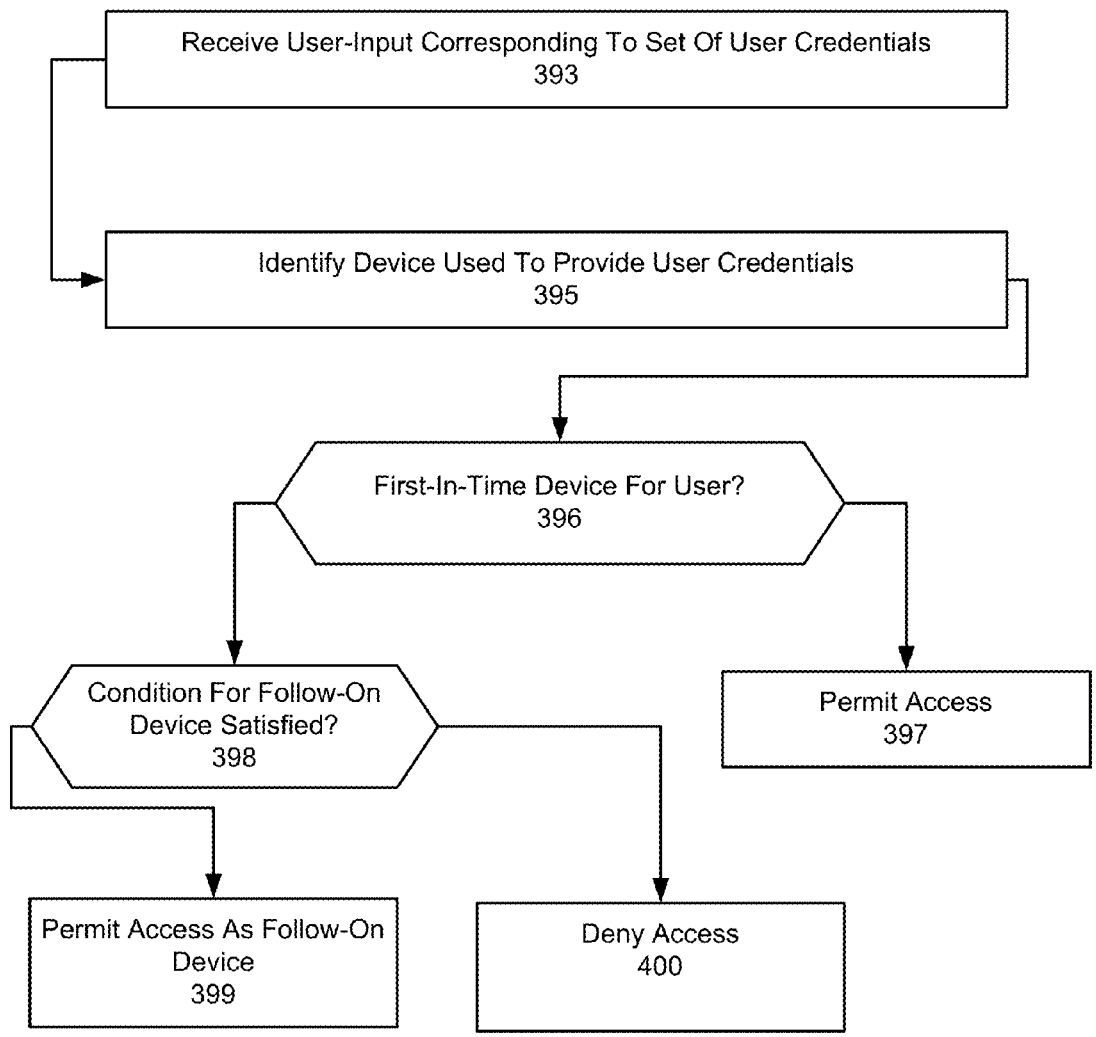
FIG. 3E illustrates a method for operating a network service to enable a user to access a network service using multiple devices, according to one or more embodiments.

FIG. 3A illustrates a method for operating a computing device to handle user interface operations for a network service, separate from a device in which playback functionality is provided. FIG. 3B illustrates a method for operating a playback device to output content from a network service, separate from a device in which user interface functionality for the network services is provided. FIG. 3C illustrates an example method for handling user interface events when user interface and playback functionality or handled by different devices, according to one or more embodiments. FIG. 3D illustrates an example method for implementing a digital rights management (DRM) scheme in context of two devices that access a network service. FIG. 3E illustrates a method for operating a network service to enable a user to access a network service using multiple devices. In describing example methods of FIG. 3A through FIG. 3E, reference may be made to elements or components described with FIG. 1 or FIG. 2 for purpose of illustrating suitable components or elements for performing a step or sub-step being described.

With reference to FIG. 3A, the user interface device 110 implements an application platform (308). In one implementation, the application platform corresponds to an application or application service that provides or otherwise enables the user interface device to access a particular network service. The application platform can be specific to the device type and platform (e.g., operating system), while at the same time being an application platform that is shared with another device and device platform (e.g., playback device 120).

The user interface device 310 operates to display user interface functionality for interacting with a network service (310). In one implementation, the user interface functionality can be proprietary, or specific to the particular network service. For example, a client and web-based application can be installed and made proprietary or specific to a particular network service. In variations, the user interface functionality can be provided in the form of an application that is generic or nonspecific to different network services. For example, an application can prompt users for input such as login and password, a designation of a specific network service they wish to use, and other input such as search or navigation input for selecting data items. Still further, the user interface functionality can be provided by way of a browser or similar application that runs on the user interface device 110. For example, a browser can load an application from a network site, and provide the network service through the application running the browser.

The user interface device 110 may operate to communicate user input to a selected network service (320). In particular, the input can include information for identifying an account associated with the user. The input can also include information to authorized user to access the account for example, the information can include a log in, or password or other identifier (e.g., machine identifier, cookie etc.). Optionally, the input can also be in the form of selection input, such as search, navigation etc.

The user interface device 110 receives a token from the network service (330). In one implementation, the token can be session specific and provide authorization for the user to access their account and network service using the user interface device 110. In providing the authorization, the network service may also identify the user interface device 110. For example, the network service may identify the user interface device 110 by one or more select parameters, including by way of cookie stored on the user interface device, or by way of a machine identifier of the user interface device 310.

The user interface device 110 can communicate a set of data items to the playback device 120 (340). The set of data items can include the token (342). In some variations, the set of data items includes one or more identifiers that the network service used to identify the user interface device 110 (344). As the user interface device 110 and the playback device 120 share a common application platform, the set of data items communicated from the user interface device 110 can enable the receiving device (e.g., playback device 120) to appear as the user interface device when accessing the network service. In variations, the set of data items includes the token, but other identifiers are obtained by the playback device 120 in a previous exchange with the user interface device 110. For example, the playback device 120 can receive the application platform (or portions thereof) from the user interface device 110 at a prior exchange, and identifiers communicated as part of the application platform can be used to determine the identifier for the network service.

Under conventional approaches, the token received from a network service is valid for the receiving device, often for a particular session. The network service pairs the subsequent use of the token with, for example, an identifier associated with the application that accesses the service. In an example of FIG. 1 and FIG. 2, the user interface device 110 and playback device 120 share copies of the same application and its identifiers (e.g., cookie). In this way, the playback device 120 is able to access a particular network service using the identifier communicated to the user interface device 110.

In some embodiments, the user interface device 110 also communicate links that the playback device 120 can use to access data items from a network service (350). For example, the user may perform search operations for selecting data items using the user interface functionality of the user interface device 110. In some embodiments, the links may directly identify data items on a specific network service. In other embodiments, such as described with FIG. 4-FIG. 6, the link is communicated from the user interface device 110 identify an intermediary rights management services, which modifies are communicates different links for using a particular network service in connection with control parameters and right management rules of that network service.

With reference to FIG. 3B, the playback device 120 implements an application platform that is shared with the UI device 110 (358). In one implementation, the application platform corresponds to an application or application service that provides or otherwise enables the playback device 120 to access a particular network service. The application platform can be specific to the device type and platform (e.g., operating system) of the playback device 120. In one variation, the playback device 120 receives at least portions of the application platform from the UI device 110.

Still further, in some variations, the playback device 120 can receive data items from the user interface device 110 (360). The data items received from the UI device 110 can include the token received from the network service, as well as one or more identifiers that enable the playback device 120 to appear as the UI device 110 when accessing the network service. By way of example, the identifiers can include a cookie originally stored on the UI device 110 (e.g., received when the UI device 110 accessed the network service), or a machine identifier of the UI device. Additionally, communication of the identifier can also be carried through the shared application platform, which can include functionality for making the playback device 120 appear as the UI device 110 for external sources.

In an embodiment, the playback device 120 can run an application that is an instance of the network service interface used to access the network service on the user interface device 110. For example, the playback device 120 may run an instance of a web-based client application for a particular network service, so that the token received from the user interface device 110 enables the playback device 120 to access the network service.

In some embodiments, the playback device 120 can receive playback links 205 from the user interface device 110 (364). The playback links 205 can locate specific data items from a particular network service. Accordingly, the playback device 120 uses the playback links 205 to receive data items from the network service (368). For example, the playback links 205 can be used to locate media files, such as songs, videos or other media content. Once located, the network service can stream data corresponding to the selected items to the playback device 120. In variations, the retrieval can identify files or documents that can be transferred to the playback device 120.

The playback device 120 can output data or content corresponding to the retrieved data items (372). In one implementation, the playback device 120 outputs content corresponding to the retrieved data items on the device. In variations, the playback device 120 has limited output capabilities, but rather it is dedicated device for streaming or signaling (e.g., in analog form) content data to other output devices, such as conventional non-network enabled televisions or stereos)

(374). In one variation, the playback device 120 can stream data to a target device using, for example, a wireless (or wireline) connection. As an addition or variation, the playback device 120 can utilize devices or resources of the personal network to output or communicate data corresponding to the retrieved data items (376). For example, the playback device 120 can transcode the retrieved data items into an alternative format using a chance coating resource or application on the personal network. As another example, the playback device 120 can stream data corresponding to the retrieved data items to a target device on the personal network while concurrently receiving a stream corresponding to the data items from the network service.

FIG. 3C illustrates a method for handling user interface events generated from a network service when multiple devices access the network service at the same time. More specifically, with reference to FIG. 3C, embodiments recognize that network services often generate user interface events, sometimes even after the session is initiated. Such user interface events can require user input to avoid disruptions, or maintain the full availability of the services. According to one embodiment, the playback device can include logic that detects when such user interface events occur when accessing a network site (380). For example, user interface events can include mandatory events, such as prompts that require the user to perform some action, such as confirm that the user is present, or have the user re-enter credential information. Other network services can require advertisements to be displayed, so that each advertisement corresponds to a user interface event. Still further, types of user interface events can include input that the user may provide in order to enhance the services. For example, the user may want to signal feedback indicating his like or dislike for a particular data item. In the context of media, for example, the user feedback can be used in selecting additional data items for that user. Thus, while the user feedback may not necessarily be required, the user may desire to provide input in order to fully realize the benefits of the network service.

With the occurrence of a user interface event, one or more embodiments provide that the playback device 120 signals the user interface device 110 as to the occurrence of the user interface event (382). In one implementation, the playback device 120 can signal the user interface device 110 that the event occurred, and the network service interface 112 of the user interface device 110 can access the network service 102 in order to obtain user interface information and functionality for enabling the user to provide feedback or response to the event (384). In another implementation, the playback device 120 can retrieve the user interface functionality, and signal it to the user interface device 110, where it is presented to the user.

FIG. 3D illustrates an example method for implementing a digital rights management (DRM) scheme in context of two devices that access a network service. In one embodiment, the UI device 110 and the playback device 120 exchange public keys (385). The UI device 110 then accesses the network service and logs in on behalf of the user (386).

After logging in, the UI device may receive a link from the network service (388). The link can be for a desired song, playlist or channel. The UI device 110 encrypts the link with the public key (390) and sends the encrypted link to the playback device (391). Additionally, the user interface device 110 may operate to communicate user input to the network service. By way of example, the input can be in the form of selection input, such as search, navigation etc. For example, the user may perform search operations for selecting data items using the user interface functionality of the user interface device 110. In some embodiments, the links may directly identify data items on a specific network service.

The playback device retains the private key and utilizes the private key to extract and communicate the link to the network service (392). In response to communicating the link, the playback device receives playback links from the network service (394). The playback links can identify data which can be streamed from the network service to the playback device. For example, the playback links can be used to locate media files, such as songs, videos or other media content. Once located, the network service can stream data corresponding to the selected items to the playback device 120. In variations, the retrieval can identify files or documents that can be transferred to the playback device 120.

FIG. 3E illustrates a method for operating a network service to enable a user to access a network service using multiple devices, according to one or more embodiments. In an embodiment, network service 102 includes one or more processors that operate to receive user-input corresponding a set of user credentials (393). The set of user credentials can include user login and password, or other identifiers that a user can specify in order to access a network service and link the network service to an account.

The network service 102 can identify a device that is used by the user to communicate the set of credentials (395). For example, the network service 102 can seek to determine a machine identifier or cookie associated with the computing device in order to determine whether the device was previously used to access the network service 102 using the same set of credentials.

When the device is identified, a determination can be made as to whether the device is a first-in-time device to access the same user account or use the same set of credentials (396). The first-in-time device corresponds to the device the user first utilized to access the network service 102 (e.g., the device the user used to establish an account and/or perform first download).

If the device is the first-in-time device, then access is permitted (397). If however, the device is not the first-in-time device, then an additional set of determinations can be made to determine whether a condition is satisfied for authenticating the identified device is a follow-on device (398). If the condition is satisfied, then the identified device is granted access to the network service as a follow-on device (399). Else, the device can be denied access to the network service (400).

The authorization given to the follow-on device can be the same or different than that provided to the first-in-time device. When the follow-on device is authorized, some embodiments provide that the network service grants access to both the first-in-time device and the follow-device at the same time (e.g., during a same network session). For example, with reference to FIG. 1, the UI device 110 can correspond to a first-time-device that the user can use to establish an account or session (e.g., the user can enter login credentials). The playback device 120 can correspond to the follow-on device. The credentials provided by the playback device 120 can be programmatically provided through, for example, an application interface of the playback device.

By way of example, some embodiments provide for a network service to utilize a condition that corresponds to the identified device being a next device. In next device authorization, the user first connects to a network with a first device that then becomes authenticated to use the particular network service. Then the very next device that accesses the network service and uses the users login and password also becomes authenticated. In this way, two devices can be authenticated for a given user. Additional next device authentication can also be performed on a third or fourth device as specified in implementation (e.g., network service allows next two devices that login and use the user's credentials to be authenticated).

As an addition or alternative, the condition for authentication can correspond to the identified device being used to access the network service within a given duration from when the first-in-time device is used.

Intermediate Rights Management Service

Many network services utilize business and rights management rules in the manner in which their services can be used. For example, online music services can limit the number of times a user can skip a song when listening to a channel. Further, in the context of media services, the service provider is generally limited to a particular library of licensed works. Under conventional approaches, these and other restrictions are typically implemented through data configurations of the client application that accesses the network service. For example, a music service often implements its business and rights management rules through programmatic controls of its corresponding client application. As a result, users may sometimes install numerous applications for various network services that they use.

Figure 4:
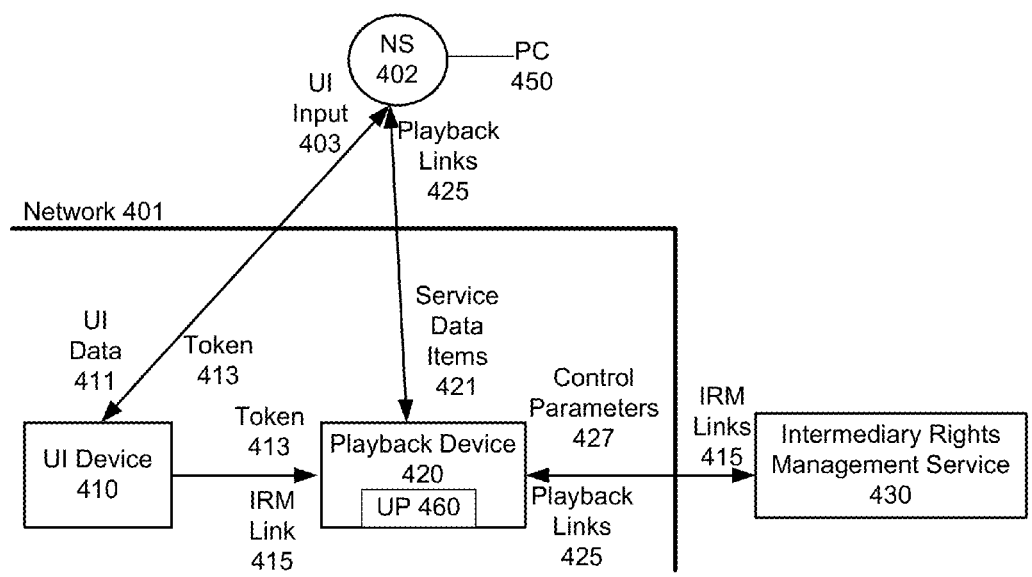
FIG. 4 illustrates a system for implementing a rights management service in context of a user interface and playback device, according to one or more embodiments.

FIG. 4 illustrates a system for implementing a rights management service in context of a user interface and playback device, according to one or more embodiments. Some embodiments described herein enable the user of a universal application on each of the UI device 410 and playback device 420 for use with multiple network services. Each of the UI device 410 and the playback device 420 can use the universal application to access any of multiple possible network services, in place of, for example, distinct and dedicated web-based applications for each of the individual network services.

In an example of FIG. 4, a UI device 410 signals a playback device 420 in using an intermediary rights management service 430 to access a selected one of multiple possible network services 402. In more detail, the UI device 410 can be operated by a user to submit, for example, user input 403, and to obtain a token 413 from the network service 402. The user interface functionality of the UI device 410 can be based in part on user interface data 411 received from the network service 402. The token 413 can be communicated to the playback device 420. In one implementation, the token 413 can be communicated automatically to the playback device 420 in response to the UI device 410 obtaining the token 413 from the network service 402.

In some embodiments, the UI device 410 can also operate to enable the user to provide selection input for data items of the network service 402. For example, the UI device 410 can receive data 411 to enable the user to select data items. For example, the UI device 410 can receive search result, menus and suggestions from the network service 402. Specific data items can be selected on the UI device 410. The UI device 410 can include a program that translates or otherwise structures the selection into an intermediate rights management (IRM) link 415, which can be communicated from the UI device 410 to the playback device 420. For example, the UI device 410 can include logic that takes the title of the selection, as well as the network service from which the selection is made, and constructs a link to the intermediate management service 430 which identifies both the selected title and the network service 402.

The playback device 420 receives the token 413 and a set of IRM links 415 from the UI device 410. The playback device 420 uses the IRM links 415 in accessing the intermediary rights management service 430. The intermediary rights management service 430 includes logic to map IRM links 415 to playback links 425 or data items of the network service 402. The intermediary rights management service 430 also includes logic that identifies control parameters 427 for the particular network service 402. The logic for determining the control parameters can also be based on context, taking into account, for example, past history or recent actions of the user (e.g., number of times that the user skipped a song). On the playback device 420, the control parameters 427 control the manner in which the playback links 425 are to be used.

The playback device 420 uses the token 413 and the playback links 425 when accessing the network service 402. The actions of the playback device 420 in using the playback links 425 can be controlled or determined by the control parameters 427. For example, the control parameters 427 can control (i) the sequence in which the playback links 425 are used, (ii) the actions that can be performed when a playback link is used, (iii) the actions that can be performed after when a playback link is used can be determined by the control parameters 427, or (iv) whether the playback link 425 can even be used (e.g., user exceeds number of hours for using network service).

Universal Player and Intermediate Service

Under a typical conventional approach, network services utilize service-specific or proprietary client applications for enabling users to access data items such as media content. Under such a conventional approach, the client application controls the manner in which the network service is used, particularly as to rights management of content provided from the network service.

In contrast, one or more embodiments provide for the use of the universal player 460 to enable computing devices to be operated in utilizing multiple network services, through one client application. With reference to FIG. 4, an embodiment provides for a programmatic component 450 to be included with the network service 402 in order to enable the network service to detect the presence of a universal player 460 on the computing device (e.g., playback device 420). When the universal player 460 is detected, the network service 402 can implement operations to communicate with that player in place of the default (e.g. proprietary) player for that service.

In order to implement rights management rules, the universal player 460 can be structured to leverage use of the intermediary rights management service 430. In one embodiment, the universal player 460 generates or otherwise structures the set of IRM links 415 from input that can be received on either the playback device 420 or on the UI device. Each IRM link 415 can be structured so as to point to the intermediary rights management service 430. The IRM links 415 can identify a specific media resource and network service. In one embodiment, the universal player 460 signals the IRM links 415 to the intermediary rights management service 430 in order to obtain playback links 425 and control parameters 437. The control parameters 427 can implement rights management rules of the network service. The implementation of the right management rules can be performed in a manner described with, for example, FIG. 4 and FIG. 5. In this way, the universal player 460 can implement different rights management rules for different network services, by communicating with the intermediary rights management service 430.

In a variation, the universal player 460 can reside on the UI device 410, and the IRM links 415 can be signaled to the playback device 420 which then obtains the playback links 425 and the control parameters 427. In another variation, the universal player 460 can reside on the UI device 410, and the universal player 460 can generate and signal the IRM links 415 to the intermediary rights management service 430 in order to obtain the playback links 425 (along with the control parameters 427). The playback links 425 and the control parameters 427 can be signaled to the playback device 420.

Figure 5:
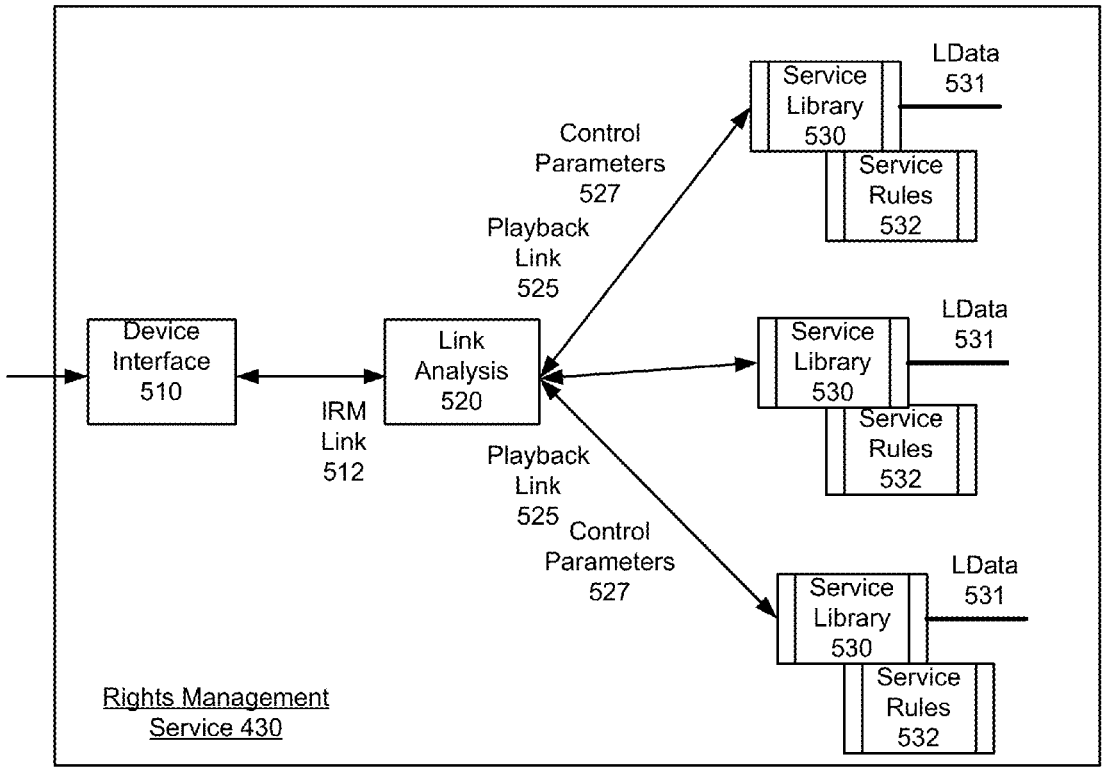
FIG. 5 illustrates an architecture for a rights management service, according to an embodiment.

FIG. 5 illustrates an architecture for a rights management service, according to an embodiment. A rights management service 430 can be implemented at, for example, a website that is accessible to playback device 120. In an embodiment, the rights management service 430 includes a device interface 510, a link analysis component 520, and a collection of services for individual network services. For each network service, the rights management service 430 includes a service library 530 and a set of service rules 532. Each service library 530 can include link data 531 that correlates identifiers specified from an incoming request with media resources available through the particular network resource. The link data 531 can enable construction of links specific to the network service of the service library 530 based on identifiers specified by the user when operating, for example, the universal player. Each service library 530 may also include a list of media resources (e.g., music titles, television programs or videos, movie titles, documents etc.) available on a corresponding network service. The service rules 532 can also designate the control parameters, such as the number of times the user can skip a title, or the number of hours that the user can receive media content from the network service.

As described with prior examples, the device interface 510 can communicate with devices to receive IRM links 512. The link analysis 520 inspects the link to identify (i) the network service, and (ii) the data item (e.g., title) that is to be retrieved from the network service. The link analysis component 520 can use link data 531 for the particular network service in order to correlate identifiers (or other aspects) of the IRM links 512 (e.g., track) into playback links 525 for the specific service. In one implementation, the link analysis component 520 obtains playback links from the respective service library 530 by using the link data 531 to correlate elements of the IRM links 512 to playback links 525. In a variation, the link analysis component 520 constructs playback links 525 using the link data 531 and the elements of the IRM links 512. In still another variation, the link analysis 520 can operate to access the service library 530 of the identified network service in order to determine the data item or playback link 525 that corresponds to the IRM link 512. The playback links 525 are communicated to the playback device 420.

Additionally, the link analysis 520 also accesses the service rules 532 for the identified network service in order to determine the control parameters 527 for use with the playback link 525. The playback link 525 and control parameters 527 are communicated back to the playback device 420 (FIG. 4) from which the IRM link 512 originated. The playback device 420 can signal the playback links 525 to the network service in order to receive streaming media identified by the individual playback links from the particular network service.

Figure 6:
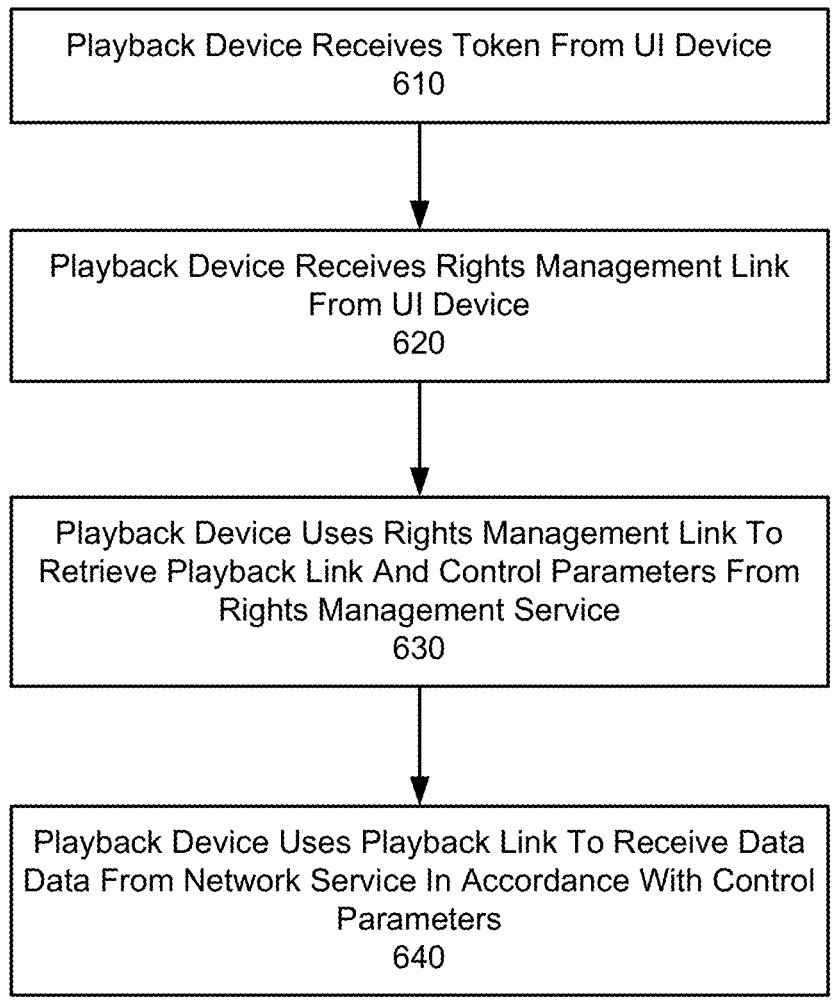
FIG. 6 illustrates a method for utilizing a rights management service, according to one or more embodiments.

FIG. 6 illustrates a method for utilizing a rights management service, according to one or more embodiments. A method such as described with FIG. 6 can be implemented using components or elements such as described with embodiments of FIG. 1, FIG. 2 or FIG. 4. Accordingly, reference may be made elements of prior examples for purpose of illustrating suitable components or elements for performing a step or sub-step being described.

According to one or more embodiments, the playback device 420 receives a token from the UI device 410 (610). The playback device 420 also receives a rights management link from the UI device 410 (620). In one implementation, the UI device 410 constructs the IRM link 512 for the rights management service 430 based on a user selection or designation of a desired data item. The constructed IRM link 512 can specify the network service that is to be used to receive the selected data items.

The playback device 420 uses the rights management link to obtain the corresponding playback link 525 (630) from the intermediary rights management service 430, rather than the network service itself. As mentioned with other examples, the rights management service 430 can provide a middle network interface for multiple different network services, each of which may have their own rights management rules. In providing the playback link 525 to the playback device, the intermediary rights management service 430 can include or integrate control parameters 527 that control use of the provided playback links 525 to be in accordance with rights management rules of the specific network service. With reference to an example of FIG. 5, the construction of the playback link 525, along with the use of control parameters 527 can be determined from the corresponding service library 530.

In this way, the rights management service 430 can determine a set of playback links 525 for a particular network service using the IRM link 512 (which can be provided from the playback device 420). The rights management service 430 can then communicate the set of playback links 525 to the playback device 420. The rights management service 430 can also encode, or specify the control parameters 527 for the playback links 525 based on the network service that is selected for the playback.

The playback device 420 uses the playback links to receive corresponding data items from the specified network service (640), in accordance with the identified control parameters for the network service 402. For example, the playback device 420 can trigger the network service 402 into streaming data corresponding to individual data items to the playback device. Alternatively, the playback device 420 can download a file or document corresponding to the identified data items.

In a variation, the UI device 410 can submit identifiers or IRM links 415 to the rights management service 430 in order to receive playback links 425. The UI device 410 can then communicate the playback links 425 to the playback device 420.

In another variation, the UI device 410 can submit identifiers or IRM links 415 to the rights management service 430, and the rights management service can signal the IRM links 415 to the playback device 420. In such an implementation, the communication from the UI device 410 can identify the playback device 420 or otherwise enable the playback device 420 to directly receive playback links 425 from the rights management service 430.

Hardware Description

Figure 7A:
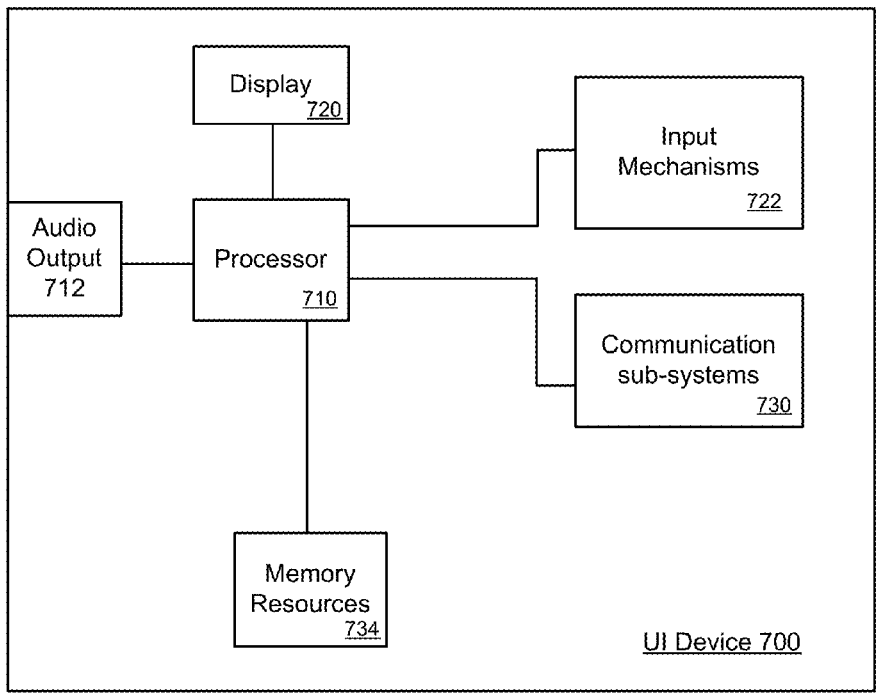
FIG. 7A illustrates a user interface device in accordance with one or more embodiments.

FIG. 7A illustrates a user interface device in accordance with one or more embodiments. By way of example, the user interface device 700 can correspond to a mobile computing device (e.g., multifunctional cellular data/voice device), tablet, laptop, ultraportable computing device, or other network enabled device that is capable of receiving user input and enabling direct user interaction.

In the example of FIG. 7A, the processor 710 is coupled to input mechanisms 722 and communication sub-systems 730 to provide the input to an external source. Sample input mechanisms 722 include keyboards, touch-screens, microphones or any appropriate device. Examples of communication sub-systems include any appropriate sub-system for sending and receiving data, such as wireless ports, or cellular ports. Processor 710 is coupled to memory resource 734 to store data, including incoming data, such as authorization token 131, referring to FIG. 1.

Processor 710 can be configured to generate audio and visual output. For example, in the embodiment of FIG. 7A, processor 710 can provide audio output 712 and visual output on display 720. A user interface may be provided on display 720 to enable user interaction with network services. The display can provide or be used in conjunction with other devices to enable users to receive user input from input mechanisms 722.

According to embodiments, the memory resources 734 store instructions for programs, applications and other logic that enable functionality such as described with examples of FIG. 1 through FIG. 6. For example, the memory resources 734 can store instructions 711, including, for example, instructions for (i) accessing network service 102 (see FIG. 1)(e.g., client/proprietary application for network service), (ii) communicate with a playback device 750 in sending, for example, a token or programmatic credential, links for accessing media resources from the network service to the playback device, and in receiving data (e.g., triggers, user interface events); (iii) providing a user interface for the user to utilize in interacting with the network service; (iv) structuring links so that they identify media resources on a network service but link to an intermediary rights management service; and/or (v) communicating as a node or satellite on a personal network.

Figure 7B:
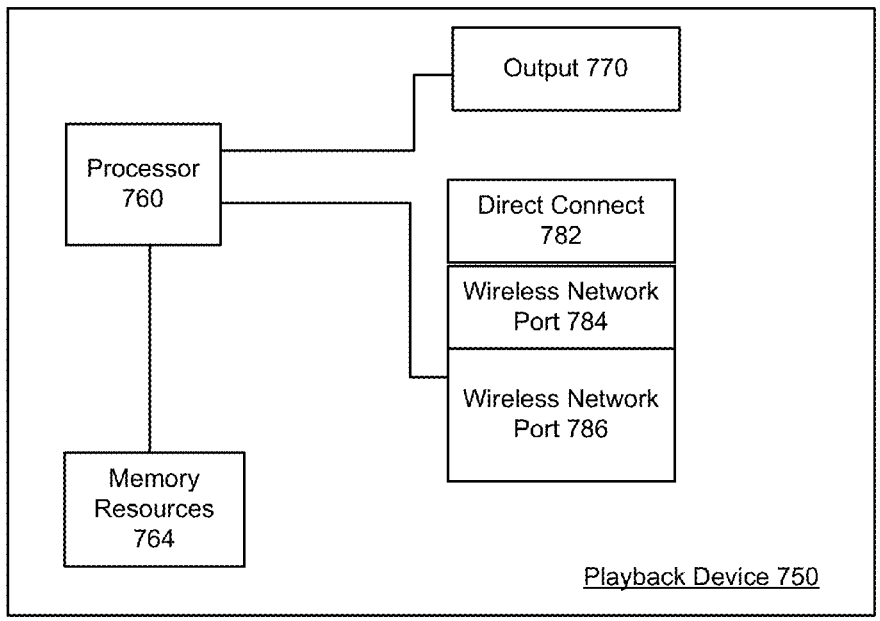
FIG. 7B illustrates a playback device in accordance with one or more embodiments.

FIG. 7B illustrates a playback or output component, according to one or more embodiments. In an example of FIG. 7B, the playback device can correspond to a device that is dedicated to generate output for other connected devices. For example, the playback device 750 can correspond to an appliance or an accessory device, having no or minimal mechanism for directly receiving user input. In one implementation, the playback device 750 corresponds to a connected accessory for non-connected devices (e.g., non-Internet enabled televisions or stereos), and can generate, for example, an output signal (digital or analog) for such devices. In variations, the playback device 750 can correspond to any computing device (e.g., mobile computing device, tablet, laptop or netbook, etc.) which the user elects to use as a playback device in connection with user interface device 700.

Processor 760 of FIG. 7B is connected to other devices or computers via network connections. In one implementation, the processor 760 generates an output data set which is outputted through the output component 770, or communicated to another device via one of the communication ports 782, 784 or 786.

In an example of FIG. 7B, playback device 750 includes a processor 760, memory resources 764, an output component 770, and one or more communication sub-systems 782, 784, 786. The output component 770 can correspond to, for example, an audio and/or video output. The communication sub-systems 782, 784, 786 can respectively include, for example, a direct connect port, a first wireless port (e.g., Wireless Fidelity or Bluetooth), and a second wireless port (e.g., cellular, etc.). Thus, the communication sub-systems 782, 784, 786 can be wireless and/or wireline. The playback device 750 can connect to other devices or computers via connections formed through the communication sub-system 782, 784 or 786. For example, in the embodiment of FIG. 7B, direct connection 730 and wireless network ports 740 and 742 enable communication to and from the processor 760. The memory resources 764 can store instructions 761, including instructions for (i) accessing network service 102, (ii) communicating with the user interface device 700 in receiving, for example, a token or programmatic credential, links for accessing media resources from the network service to the playback device, and in sending data (e.g., triggers, user interface events); (iii) operating a universal player capable of connecting to and accessing multiple different services and utilizing an intermediate rights management service to perform a variety of actions; and/or (iv) communicating as a node or satellite on a personal network.

Embodiments have been described in detail herein with reference to the accompanying drawings, variations to specific embodiments and details are encompassed by this disclosure. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A system comprising:
 a memory that stores instructions;
 one or more processors that use instructions stored in memory to:
 identify a device used to communicate a set of credentials;
 determine that the identified device is not a first-in-time device used to access a network service using the set of credentials;
 determine whether a condition is satisfied for authenticating the identified device as a follow on device to the first-in-time device, the condition including the identified device accessing the network service using the set of credentials within a defined time period following the first-in-time device accessing the network service using the set of credentials;
 if the condition is satisfied, permit access to the network service for the identified device based on the set of user credentials;
 else deny access to the network service.

2. The system of claim 1, wherein the condition includes the identified device being a next device after the first-in-time device to access the network service using the set of credentials.

3. The system of claim 1, wherein if the identified device is permitted to access the network service, the one or more processors permit the first-in-time device and the identified device to access the network service during a same session.

4. The system of claim 1, wherein the set of credentials include a password.

5. The system of claim 1, wherein the set of credentials includes an encrypted token.

6. A method for providing a network service, the method being implemented by one or more processors and comprising:
 identifying a device used to communicate a set of credentials;
 determining that the identified device is not a first-in-time device used to access the network service using the set of credentials;
 making a determination as to whether a condition is satisfied for authenticating the identified device a follow on device to the first-in-time device, the condition including the identified device accessing the network service using the set of credentials within a defined time period following the first-in-time device accessing the network service using the set of credentials; and permitting access to the network service for the identified device based on the set of user credentials only if the condition is satisfied.

7. The method of claim 6, wherein the condition includes the identified device being a next device after the first-in-time device to access the network service using the set of credentials.

8. The method of claim 6, wherein if the identified device is permitted to access the network service, the one or more processors permit the first-in-time device and the identified device to access the network service during a same session.

9. The method of claim 6, wherein the set of credentials include a password.

10. The method of claim 6, wherein the set of credentials includes an encrypted token.

11. A non-transitory computer-readable medium that stores instructions that, when executed by one or more processors, causes the one or more processors to perform operations that include:
 identifying a device used to communicate a set of credentials;
 determining that the identified device is not a first-in-time device used to access a network service using the set of credentials;
 determining whether a condition is satisfied for authenticating the device as a follow on identified device to the first-in-time device, the condition including the identified device accessing the network service using the set of credentials within a defined time period following the first-in-time device accessing the network service using the set of credentials;
 if the condition is satisfied, permit access to the network service for the identified device based on the set of user credentials;
 else deny access to the network service.

12. The computer-readable medium of claim 11, wherein the condition includes the identified device being a next device after the first-in-time device to access the network service using the set of credentials.

13. The computer-readable medium of claim 11, wherein if the identified device is permitted to access the network service, the one or more processors permit the first-in-time device and the identified device to access the network service during a same session.

14. The computer-readable medium of claim 11, wherein the set of credentials include a password.

15. The computer-readable medium of claim 11, wherein the set of credentials includes an encrypted token.

16. A system comprising:
 means for identifying a device used to communicate a set of credentials;
 means for determining that the identified device is not a first-in-time device used to access a network service using the set of credentials;
 means for making a determination as to whether a condition is satisfied for authenticating the identified device as a follow on device to the first-in-time device, the condition including the identified device accessing the network service using the set of credentials within a defined time period following the first-in-time device accessing the network service using the set of credentials;
 means for permitting access to the network service for the identified device based on the set of user credentials only if the condition is satisfied.

17. The system of claim 16, wherein the condition includes the identified device being a next device after the first-in-time device to access the network service using the set of credentials.

18. The system of claim 16, wherein if the identified device is permitted to access the network service, the one or more processors permit the first-in-time device and the identified device to access the network service during a same session.

19. The system of claim 16, wherein the set of credentials include a password.

20. The system of claim 16, wherein the set of credentials includes an encrypted token.

* * * * *